United States Patent
Blackmer et al.

(10) Patent No.: US 9,061,591 B2
(45) Date of Patent: Jun. 23, 2015

(54) INSTRUMENT PANEL POINTER WITH TRANSPARENT SECTION

(71) Applicant: DELPHI TECHNOLOGIES, INC., Troy, MI (US)

(72) Inventors: Stephen C. Blackmer, Millington, MI (US); Mark J. Clugston, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 171 days.

(21) Appl. No.: 13/961,299

(22) Filed: Aug. 7, 2013

(65) Prior Publication Data
US 2015/0042462 A1 Feb. 12, 2015

(51) Int. Cl.
*B60K 35/00* (2006.01)
*B60K 37/02* (2006.01)

(52) U.S. Cl.
CPC ........... *B60K 37/02* (2013.01); *B60K 2350/408* (2013.01)

(58) Field of Classification Search
CPC ....................................................... B60K 37/02
USPC .................................. 715/771–772; 340/438
See application file for complete search history.

(56) References Cited

U.S. PATENT DOCUMENTS

| | | | |
|---|---|---|---|
| 4,985,621 A | 1/1991 | Aull et al. | |
| 6,262,427 B1 | 7/2001 | Gordon | |
| 6,714,126 B2 * | 3/2004 | Wada | 340/438 |
| 8,382,348 B2 | 2/2013 | Kamiyama | |
| 8,831,824 B2 * | 9/2014 | Moinzadeh et al. | 701/36 |
| 2002/0140552 A1 * | 10/2002 | Wada | 340/438 |
| 2007/0024950 A1 | 2/2007 | Verhaegh et al. | |
| 2012/0019760 A1 | 1/2012 | Timusk et al. | |

\* cited by examiner

*Primary Examiner* — William Titcomb
(74) *Attorney, Agent, or Firm* — Lawrence D. Hazelton

(57) ABSTRACT

A vehicle instrument panel assembly that includes a display surface and a pointer equipped with an electro-optical cell. The display surface is equipped with a graphical indicator. The graphical indicator is selectively operable to an off-state and an illuminated-state. The pointer is operable to move about an axis to point to indicia on the display surface. The pointer is operable to a position that obstructs the graphical indictor from view. The electro-optical cell is operable to a transparent-state and located on the pointer to overlay the graphical indicator when the pointer is at the position that obstructs the graphical indictor from view. The cell is operated to the transparent-state when the graphical indicator is operated to the illuminated-state.

5 Claims, 2 Drawing Sheets

INSTRUMENT PANEL POINTER WITH TRANSPARENT SECTION

TECHNICAL FIELD OF INVENTION

This disclosure generally relates to a vehicle instrument panel assembly, and more particularly relates to a pointer configured so a portion of the pointer becomes relatively transparent if the portion obstructs a graphical indicator from view.

BACKGROUND OF INVENTION

As vehicles become more sophisticated, it is necessary to convey more information to an operator of a vehicle. For example, vehicle systems such as traction control, occupant protection (e.g. air-bags), anti-lock braking, cruise control, and forward and reward illumination are often configured to perform self-diagnostic tests. If a self-diagnostic test detects a problem with a system, a graphical indicator or telltale on a vehicle instrument panel may be illuminated to inform the operator of the problem. As the number of graphical indictors increases, but the area of the instrument panel display surface remains the same, instrument panel assemblies that employ mechanical pointers may have situations where the pointer undesirable obstructs the view of the graphical indicator.

SUMMARY OF THE INVENTION

In accordance with one embodiment, a vehicle instrument panel assembly is provided. The assembly includes a display surface and a pointer equipped with an electro-optical cell. The display surface is equipped with a graphical indicator. The graphical indicator is selectively operable to an off-state and an illuminated-state. The pointer is operable to move about an axis to point to indicia on the display surface. The pointer is operable to a position that obstructs the graphical indictor from view. The electro-optical cell is operable to a transparent-state and located on the pointer to overlay the graphical indicator when the pointer is at the position that obstructs the graphical indictor from view. The cell is operated to the transparent-state when the graphical indicator is operated to the illuminated-state.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
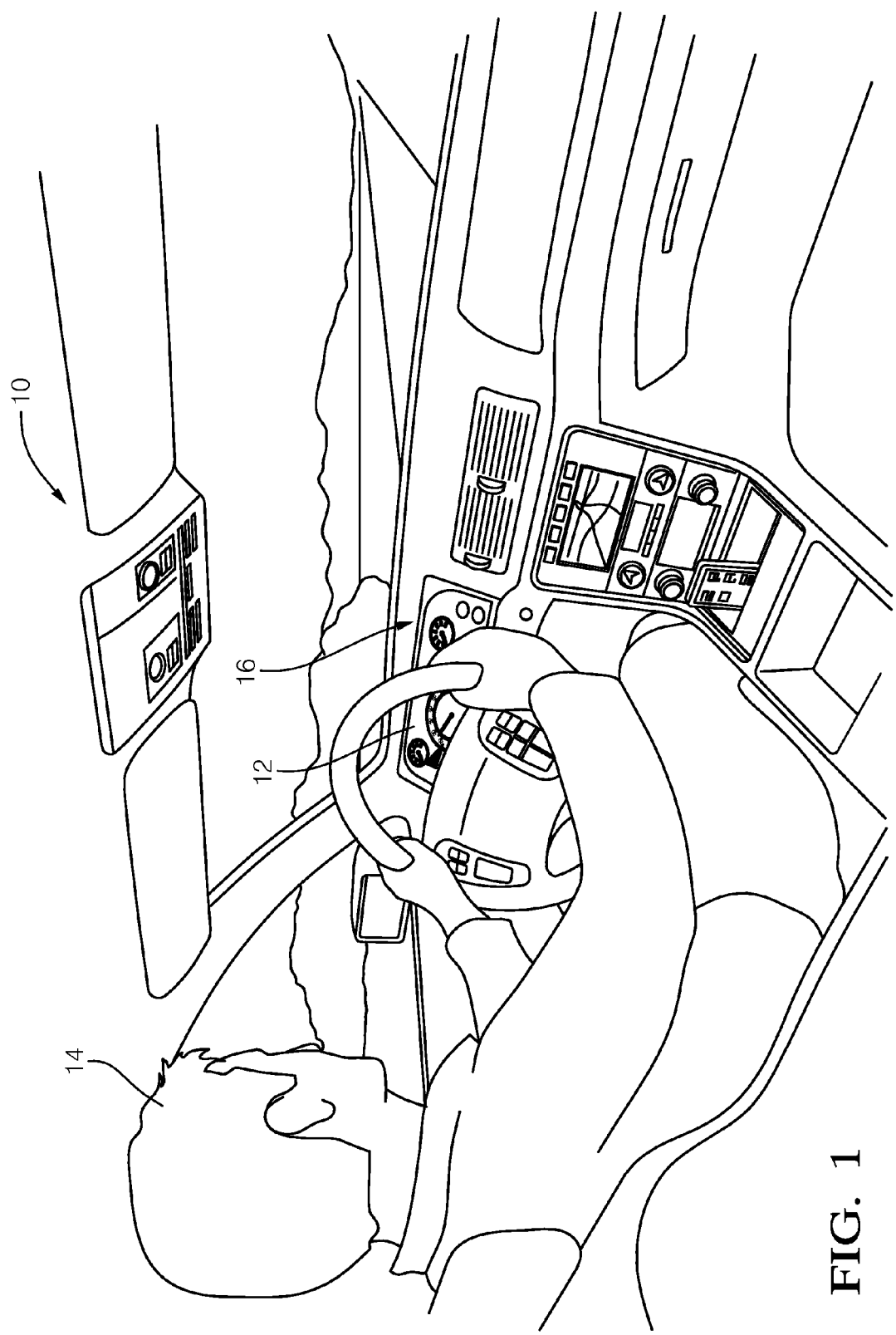
FIG. 1 is a perspective view of a vehicle interior equipped with an instrument panel assembly in accordance with one embodiment.

FIG. 1 illustrates a non-limiting example of a vehicle 10 equipped with an instrument panel assembly, hereafter referred to as the assembly 12, installed into a dashboard 16 of the vehicle 10. In general, the assembly 12 displays vehicle information to an operator 14 or operator of the vehicle 10 such as vehicle speed, engine coolant temperature, and the like.

Figure 2:
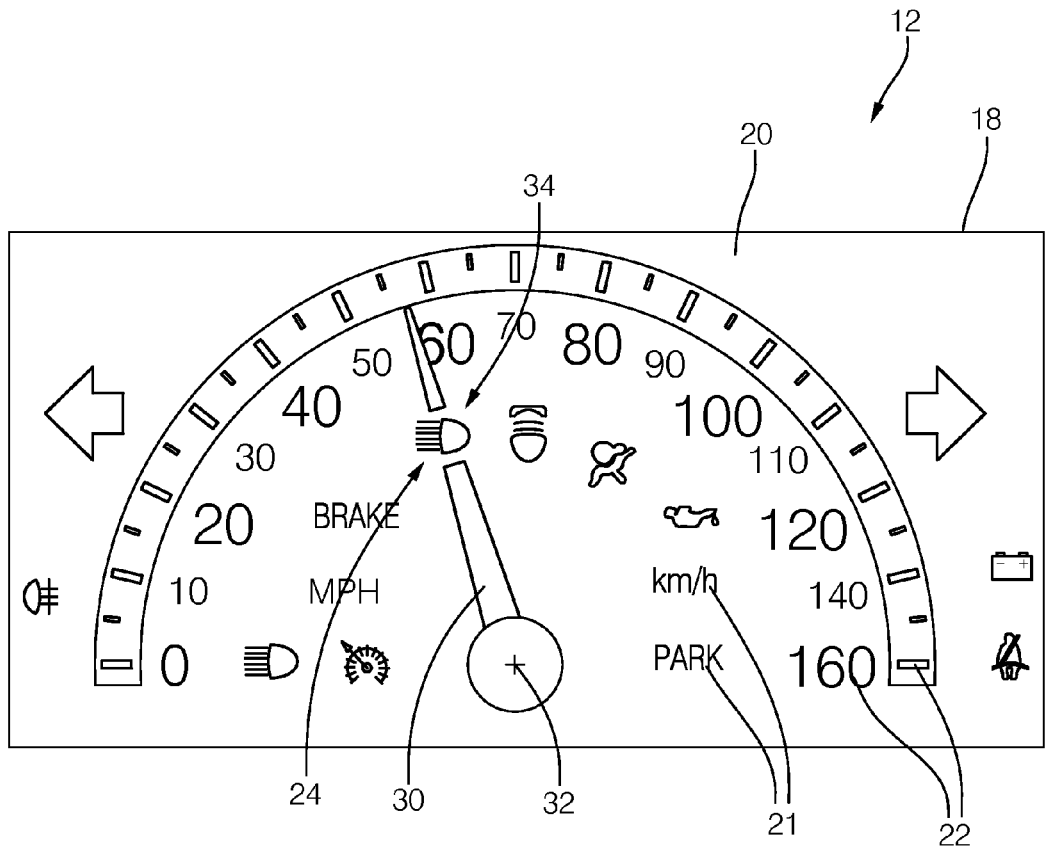
FIG. 2 is a front view of the instrument panel of FIG. 1 in accordance with one embodiment.
Figure 3:
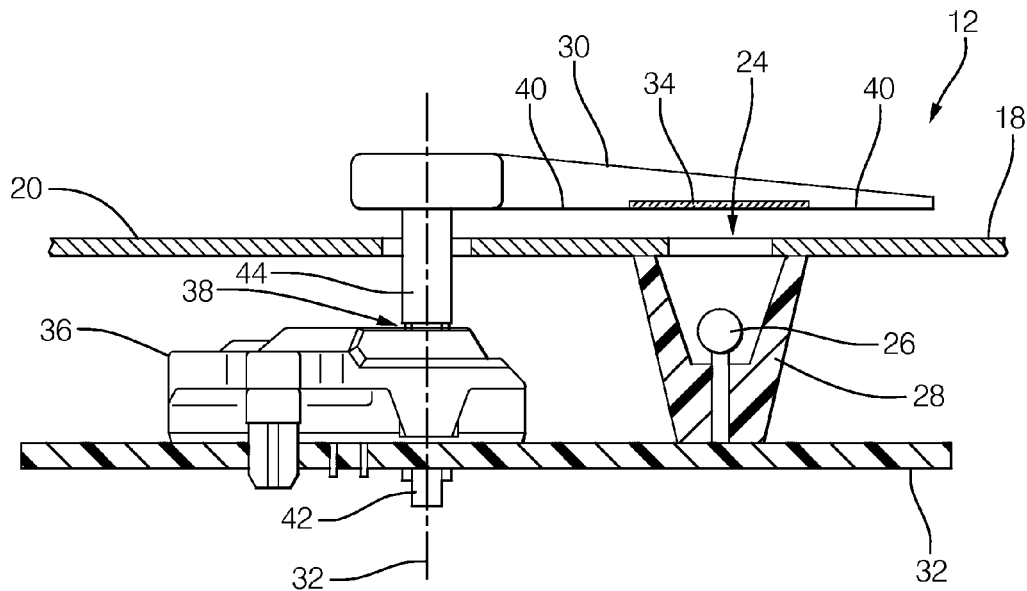
FIG. 3 is a side view of the instrument panel of FIG. 1 in accordance with one embodiment.

FIGS. 2 and 3 illustrate a non-limiting examples or portions of the assembly 12 as it might appear when not installed into the dashboard 16 of the vehicle 10. In general, the assembly 12 includes an applique 18 that defines a display surface 20 of the assembly 12. In this example the applique 18 spans most of the viewing area of the assembly 12. The applique 18 typically includes graphics 21 and indicia 22 that determine the appearance of an instrument panel (the assembly 12). Some of the graphics 21 or the indicia 22 are configured to become visibly apparent to the operator 14 only when suitably backlit. In this way the display surface 20 is equipped with a graphical indicator 24 that is selectively operable to an off-state and an illuminated-state by selectively operating an indicator light 26 that may be housed in a light shroud 28 and attached to a printed circuit board 32.

The assembly 12 generally includes a pointer 30 operable to move about an axis to point to the indicia 22 on the display surface 20. Typically, the pointer 30 described herein is formed mostly of transparent material such as a clear polymeric compound so that the pointer can be illuminated as described below. In addition to the transparent material, the pointer 30 may include areas that are coated with opaque, translucent, or reflective materials for reasons that will become apparent. As vehicles become more sophisticated, the number of graphical indicator 24 present on the display surface 20 increase, and so the pointer 30 may be operable to a position that obstructs the graphical indicator 24 from being viewed by the operator 14. In order to overcome this obstruction problem, the pointer 30 is preferably equipped with an electro-optical cell 34 operable to a transparent-state and located on the pointer 30 to overlay the graphical indicator 24 when the pointer 30 is at the position that obstructs the graphical indicator 24 from being viewed by the operator 14 view.

As used herein, the electro-optical cell 34 may be any of several know technologies such as electro-chromic glass, commonly known as smart-glass, or liquid-crystal-display (LCD) technology, electrowetting technology, or an electrically switchable transreflective mirror (ESTM) available from Kent Optronics, Inc. located in Hopewell Junction, N.Y., USA. Preferably, the electro-optical cell 34 is operated to the transparent-state when the graphical indicator 24 is operated to the illuminated-state by activating or illuminating the indicator light 26. If the location of the pointer 30 is known, the operation of the electro-optical cell 34 to the transparent-state may be limited to only when the pointer 30 would otherwise obstruct the view of the graphical indicator 24. In one embodiment, location or position of the pointer 30 is determined by a stepper motor assembly 36, and so the position of the pointer is well-known, as will be recognized by those in the art. Alternatively, the electro-optical cell 34 may be to the transparent-state whenever the graphical indicator is illuminated, regardless of the location of the pointer 30. This mode of operation may be advantageous if the various graphics 21 are arranged in a well-defined arc that is swept by the electro-optical cell 34 as the pointer 30 rotates to various locations or positions.

In this example, the electro-optical cell 34 is located on the underside of the pointer 30. That is, the side of the pointer adjacent the display surface 20. The pointer 30 may include wires (not shown) or electrically conductive paint, or other known means to conduct an electrical signal to the electro-optical cell 34. The pointer 30 may also include brushes 38 or other known means for electrically coupling a moving object such as the pointer 30 to a fixed object such as the housing of the stepper motor assembly 36 and/or the printed circuit board 32.

The portion of the underside of the pointer 30 not occupied may be identified as a non-transparent portion 40. If the electro-optical cell 34 is an LCD type device, the electro-optical cell 34 is generally operable to a transparent-state and an opaque-state (e.g. black). In this case, it may be preferable for the non-transparent portion 40 of the pointer 30 to be coated with a paint that mimics the electro-optical cell 34 when operated to the opaque-state. Alternatively, if electro-optical cell 34 is a transreflective mirror, and so the electro-optical cell 34 is also operable to a reflective-state, then it may be preferable for the non-transparent portion 40 to be reflective. Alternatively, if the electro-optical cell 34 is electrochromic glass and so is operable to an opaque-state in addition to the transparent-state, it may be preferable to have the non-transparent portion 40 treated to mimic the appearance of the electro-optical cell 34 when in the opaque-state.

In one embodiment, the pointer 30 may be illuminated by a light source 42, such as an LED, configured to emit light in to the shaft 44 of the pointer 30 and thereby illuminate the portion of the pointer 30 viewed by the operator. If the pointer was not equipped with the electro-optical cell 34 and the entire underside of the pointer was coated with an opaque or reflective material, the pointer 30 could obstruct the graphical indicator 24 or graphics 21. By adding the electro-optical cell 34 and operating the electro-optical cell 34 to a transparent-state when necessary, the obstruction of the graphical indicator is reduced or eliminated as light from the graphical indicator 24 is more readily viewed by the operator 14.

The assembly may include a controller (now shown) in electrical communication with the indicator light 26 and the stepper motor assembly 36. The controller may include a processor such as a microprocessor or other control circuitry as should be evident to those in the art. The controller may include memory, including non-volatile memory, such as electrically erasable programmable read-only memory (EEPROM) for storing one or more routines, thresholds and captured data. The one or more routines may be executed by the processor to perform steps for determining if signals received by the controller from the vehicle 10 indicate that the graphical indicator should be illuminated, as described herein.

Accordingly, a vehicle instrument panel assembly (the assembly 12) equipped with a pointer 30 having an electro-optical cell 34 is provided. The electro-optical cell 34 is advantageously operable to a transparent-state so that the pointer 30 does not obstruct the view of a graphical indicator 24 from being seen by the operator 14.

While this invention has been described in terms of the preferred embodiments thereof, it is not intended to be so limited, but rather only to the extent set forth in the claims that follow.

We claim:

1. A vehicle instrument panel assembly comprising:
   a display surface equipped with a graphical indicator, said graphical indicator selectively operable to an off-state and an illuminated-state; and
   a pointer operable to move about an axis to point to indicia on the display surface,
   wherein the pointer is operable to a position that obstructs the graphical indicator from view, wherein the pointer is equipped with
   an electro-optical cell operable to a transparent-state and located on the pointer to overlay the graphical indicator when the pointer is at the position that obstructs the graphical indicator from view, wherein the electro-optical cell is operated to the transparent-state when the graphical indicator is operated to the illuminated-state.

2. The assembly in accordance with claim 1, wherein the electro-optical cell is operated to the transparent-state when the graphical indicator is operated to the illuminated-state and the pointer is at the position that obstructs the graphical indictor from view.

3. The assembly in accordance with claim 1, wherein the electro-optical cell is also operable to an opaque-state.

4. The assembly in accordance with claim 1, wherein the electro-optical cell is also operable to a reflective-state.

5. The assembly in accordance with claim 1, wherein the electro-optical cell is formed of electrochromic glass.

* * * * *